United States Patent [19]

Lee

[11] Patent Number: 5,020,040
[45] Date of Patent: May 28, 1991

[54] OVERWRITING SYSTEM FOR MAGNETO-OPTICAL RECORDING WITH SELF TIMING TRACK

[75] Inventor: Neville K. Lee, Medfield, Mass.

[73] Assignee: Digital Equipment Corporation, Maynard, Mass.

[21] Appl. No.: 65,931

[22] Filed: Jun. 24, 1987

[51] Int. Cl.$^5$ .................. G11B 13/04; G11B 11/12; G11B 11/10

[52] U.S. Cl. ........................................ 369/13; 369/47; 360/59

[58] Field of Search ................. 369/13, 47, 48, 32, 369/54, 58, 59, 116, 106; 365/122; 360/114, 59

[56] References Cited

U.S. PATENT DOCUMENTS

| | | | |
|---|---|---|---|
| 4,067,044 | 1/1978 | Maeda et al. | 369/32 |
| 4,094,013 | 6/1978 | Hill et al. | 365/234 |
| 4,363,116 | 12/1982 | Kleuters et al. | 369/32 |
| 4,390,600 | 6/1983 | Ohta et al. | 428/621 |
| 4,610,912 | 9/1986 | Takahashi et al. | 428/213 |
| 4,642,803 | 2/1987 | Drexler | 369/54 |
| 4,649,519 | 3/1987 | Sun et al. | 365/122 |
| 4,679,180 | 7/1987 | Kryder et al. | 369/54 |
| 4,730,289 | 3/1988 | Saitoh et al. | 369/47 |

FOREIGN PATENT DOCUMENTS

| | | | |
|---|---|---|---|
| 113506 | 6/1984 | Japan . | |
| 59-113507 | 6/1984 | Japan | 369/13 |
| 59-121608 | 7/1984 | Japan | 369/47 |

OTHER PUBLICATIONS

Shieh & Kryder, "Magneto-Optic Recording Materials with Direct Overwrite Capability", *Appl. Phys. Lett.* 49(8), Aug. 25, 1986, pp. 473-474.

Matsushita et al, "Thermomagnetic Writing in Gd–Co Sputtered Films", IEEE Transactions on Magnetics, vol. Mag-11, No. 5, Sep. 1975, pp. 1109–1111.

Rothchild, "Optical Memories Eye Computer Markets", *High Technology*, Feb., 1984, p. 26.

Shieh and Kryder, "Operating Margins for Magneto-Optic Recording Materials with Direct Overwrite Capability", *IEEE Transactions on Magnetics*, vol. 23, No. 1, pp. 171–173, Jan. 1987.

Primary Examiner—Stuart S. Levy
Assistant Examiner—Hoa Nguyen
Attorney, Agent, or Firm—Fish & Richardson

[57] ABSTRACT

Modulating the intensity of directed energy for thermal writing of memory cells overwrites bits of either state in a storage layer of magnetic material irrespective of the preexisting condition of the cell without employing a magnetic field whose origin is external to the storage layer. Directed energy is synchronized with the medium by superimposing, preferably nonmagnetically, self-timing information on the medium itself and synchronously recovering the self-timing information to assist in directing energy to the medium. The medium itself has a magnetic layer plus recoverable timing information fixed in the medium along a predetermined path preferably embodied in a fixed periodic uniform variation in the nonmagnetic reflection properties along the track.

14 Claims, 3 Drawing Sheets

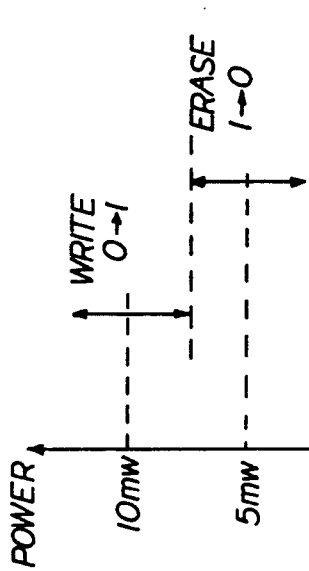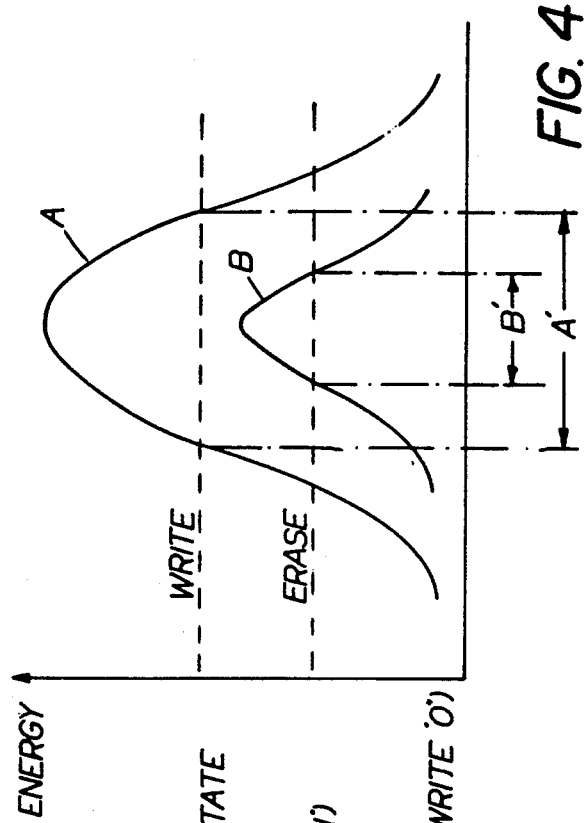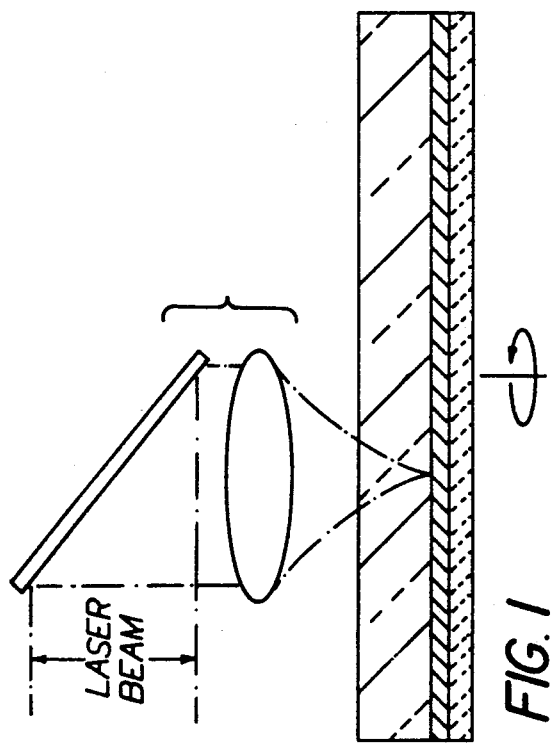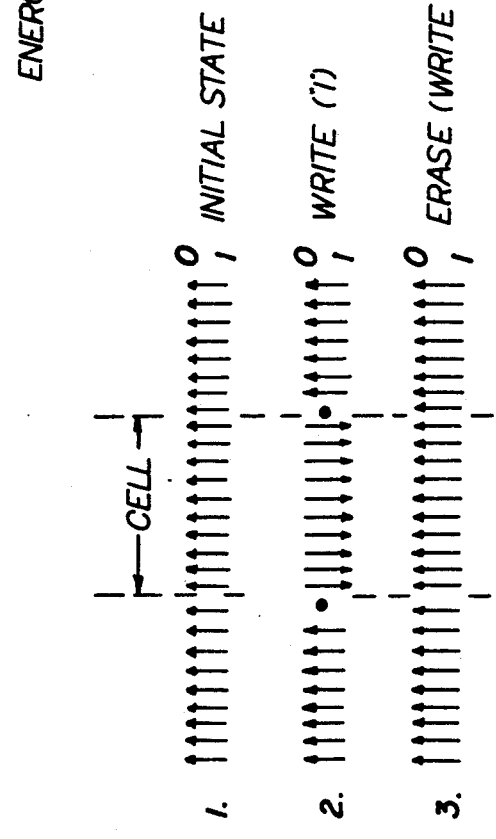

OVERWRITING SYSTEM FOR MAGNETO-OPTICAL RECORDING WITH SELF TIMING TRACK

BACKGROUND OF THE INVENTION

This invention relates to techniques for recording digital information on magneto-optical storage media.

The exploding demand for computer memory has propelled current research in memory systems in the direction of magneto-optical (M-O) technology. The M-O medium, typically in the form of a disk, comprises a thin magnetic layer covered with a relatively thick transparent coating. Digital information is stored in the M-O medium by locally magnetized regions or domains in the magnetic layer of one polarity or another corresponding to "1's" and "0's". While the information is thus retained magnetically in a manner analogous to conventional magnetic media, the writing and reading processes usually involve laser beams. M-O writing is thermally assisted. A pulsed laser beam is focused through the transparent overcoat onto the surface of the magnetic layer. The coercivity of the magnetic media exposed to the beam is temporarily lowered by the heat induced by the laser pulse, enabling the local orientation of the magnetic domains to be redirected by means of a magnetic field. Reading is accomplished through Kerr or Faraday rotation of the angle of polarization of a low power (nonheating) incident laser beam ordinarily supplied by the same laser used in writing. Depending on the local orientation of the magnetic media, the polarization angle of the reflected beam rotates slightly clockwise or counterclockwise. This shift in the polarization angle determines whether the cell contains a "1" or a "0". Facilitating the overwriting of memory cells in M-O media, thereby changing the contents of the cells, is of major interest because it allows M-O disks to replace lower capacity, less rugged magnetic media systems in a variety of commercially important applications.

The most common approach for writing on an M-O disk requires a two pass operation. First, the area of the disk to be written is erased in order to bring the magnetic domains in that area into a known uniform condition. To perform this erase operation, an external magnetic field, provided by a magnetic coil, a permanent magnet or even another layer in the disk, is applied to a region of the disk on the first pass of the write operation. Once the erase cycle has oriented the magnetic dipoles in a known direction (defined as "0"), the writing portion of the operation begins. To write the disk, the external magnetic field is reversed and selected domains are thermal magnetically written as "1" bits, leaving the "0" bits unchanged. This scheme requires a minimum of two passes to write data, i.e., an erase cycle and a write cycle, and so reduces the performance of the M-O system.

Recently an overwrite scheme has been proposed which employs the self-demagnetization field of the M-O media itself to change the polarization of a desired memory cell such that no external magnetic field is required. See Shieh and Kryder, "Operating Margins for Magneto Optic Recording Materials with Direct Overwrite Capability", *IEEE Transactions on Magnetics*, Volume 23, No. 1, pages 171-173 (1987), incorporated by reference herein. (A copy of a preprint of the foregoing article accompanies this application in the Information Disclosure Statement filed simultaneously herewith.) The basic principle, as described in the Shieh et al article, is described briefly herebelow.

Self demagnetization is the tendency for the orientation of the dipoles in a magnetic material to align with opposite orientation so as to minimize their energy. The lowest energy configuration for a system of dipoles is with alternating polarities. Within a magnetic material, there are two kinds of pertinent magnetic forces: the long-range magnetic force and the short-range exchange force. Exchange forces between dipoles tend to keep adjacent dipoles aligned while the long range forces tend to impose on any one dipole a force proportional to the orientation of the rest of the dipoles in the material. The region of aligned dipoles is a domain and the demarcation between domains is called the Bloch wall. It is this balancing of the short and long range forces that keeps the domain from growing until it encompasses the entire material or from shrinking until the orientation of all of the dipoles is randomized. The process of creating a domain begins with heating a local region of the magnetic material by a laser pulse of a certain energy level. The dipoles in the region change their orientation because the coercivity of the region is lowered by the heating process. The self-demagnetization force can then force the dipoles in the region to align in the opposite direction thus creating a domain of opposite polarity.

To erase a domain, a shorter duration pulse is directed toward an existing domain. The erasure pulse should be approximately centered with respect to the original domain. There is again a decrease in coercivity which causes the central portion of the domain to flip with respect to the rest of the domain. Once this occurs, the domain comes unstable and the exchange energy causes the domain wall to move outward. In a short time, this realignment moves through the domain, acting as an erasure.

Thus, pulses of different duration can be used to either erase or write regions of an M-O disk without the need for an external magnetic field.

The Shieh and Kryder article states that when the foregoing system is coupled with a read-before-write scheme, it is possible to achieve direct overwrite. In their proposal, two laser beams are used. The first beam reads information on a previously written track. The second laser beam does the erasing or writing. Let us assume that the M-O disk has been initialized to all "0's". The first beam, which can be referred to as a "scout", reads the track to see whether a particular bit is already a "1" or a "0". If the scout beam determines that the bit is a "1" and the new data to be written is also a "1", the second laser beam is not activated. Similarly, if the scout beam reads a "0" and the second beam was to write a "0", the second beam is not activated. If however, the scout beam detects a "0" when a "1" needs to be written, a write pulse is applied via the second laser beam to align the dipoles and create a domain. If a "1" is present and a "0" needs to be written, the second laser beam applies an erase pulse to annihilate the existing domain.

In addition to providing one of the inputs to the logic which determines whether to activate the second laser beam, the first or scout beam also provides timing information enabling the second beam to be directed accurately at the memory cell so that the second beam is approximately centered on an existing domain in the case of an erasure. However, in order for the timing information to be valid, the distance between the scout and write/erase beams has to be kept constant with high precision. Due to thermal distortion and relaxation, this is in practice difficult to achieve.

SUMMARY OF THE INVENTION

A general feature of the invention is an improved overwriting system for magneto-optical recording by modulating the intensity of directed energy for thermal writing of memory cells to overwrite bits of either state in a storage layer of magnetic material irrespective of the preexisting condition of the cell without employing a magnetic field whose origin is external to the storage layer.

Preferred embodiments of the invention include the following features. The intensity modulation can be accomplished by selecting one or the other of two energy ranges corresponding respectively to said states either in terms of power or of pulse duration, or both. The ranges are preferably substantially mutually exclusive. Overwriting is accomplished by directing energy within a first predetermined range at a spot substantially centered within a cell in the magnetic layer of the M-O medium to write thermally a magnetic symbol representing a bit of one state by either leaving the cell unaffected if it does not already have a walled domain or by reversing the polarity of a preexisting walled domain in the cell and directing energy within a second predetermined range substantially mutually exclusive of the first range at a spot substantially concentric with another cell in the magnetic layer to write thermally a magnetic symbol representing a bit of the other state by either leaving the cell unaffected if it already contains a walled domain or by reversing the polarity of a region within the cell to create a walled domain if none preexists. Preferably, the first predetermined range is lower than the second range and is selected such that the diameter of a preexisting walled domain is substantially larger than the diameter of that portion of the directed energy which is effective in heating the magnetic media to a sufficient threshold to create a walled domain within the preexisting walled domain. Self-timing information superimposed in fixed relationship with physical locations on the disk is preferably embedded in the medium itself and recovered to assist in aligning the directed energy with the cells. The self-timing information is preferably nonmagnetically stored as a uniform variation in reflection properties along a series of cells.

Another general feature of the invention is a method of synchronizing directed energy with a magneto-optical medium in general, including superimposing self-timing information on the medium itself and synchronously recovering the self-timing information to assist in directing energy to the medium.

Preferred embodiments of this aspect of the invention include the following features. The self-timing information is preferably nonmagnetically stored in the medium and recovered from the same beam of energy reflected from the medium used in interrogating the medium to recover magnetically stored information. The self-timing information is preferably prerecorded as a variation in the surface of the magnetic layer itself to modulate the amplitude of the reflected beam.

Another general feature of the invention is a novel magneto-optical medium and its method of manufacture. In particular, a magneto-optical medium is provided having a magnetic layer and recoverable timing information fixed in the medium along a predetermined path for use in establishing the location of memory cells. Preferably, the timing information is embedded in a fixed periodic uniform variation in reflection properties along the track. Such a medium may be manufactured by impressing a fixed surface pattern representing the information on a transparent substrate and applying a layer of thermally writable magnetic material over the surface pattern.

The overall simplification of the write/erase process for M-O media presents several advantages in cost and performance. A single laser beam of selectable energy for inherently discriminating between writing and erasing obviates the preliminary erase cycle as external field switching is not required. Moreover, the disclosed technique works irrespective of the preexisting condition of the cell. The proposed overwrite system can be implemented not only with a single laser but even with a single laser beam, i.e., single set of optics, thus simplifying the apparatus and eliminating the need to maintain a constant distance between separate beams despite thermal distortion and relaxation. It is not necessary to know the preexisting condition of the memory cell with the present system. Moreover, the location of the memory cells can be preestablished with respect to a source of timing information which is immutably fixed with respect to physical locations on the medium itself. The timing information may be embedded preferably permanently in the medium itself. The self-timing track principle combines optical read-only techniques with erasable magneto-optics to generate a fixed reference simultaneously readable through the same optics with the variable magnetically stored information.

Other advantages and features will become apparent from the following description of the preferred embodiments and from the claims.

DESCRIPTION OF THE PREFERRED EMBODIMENTS

We first briefly describe the drawings.

FIG. 1 is a schematic drawing of a magneto-optical disk and optical read/write head, showing the disk layers in cross-section.

FIG 2 is a schematic representation of the initial, written and erased states of a given magnetic memory cell.

FIG. 3 is a graph illustrating power ranges for write and erase laser pulses.

FIG. 4 is a graph of energy versus displacement illustrating the spatial distributions of energy in the write and erase beams respectively.

STRUCTURE

Figure 5:
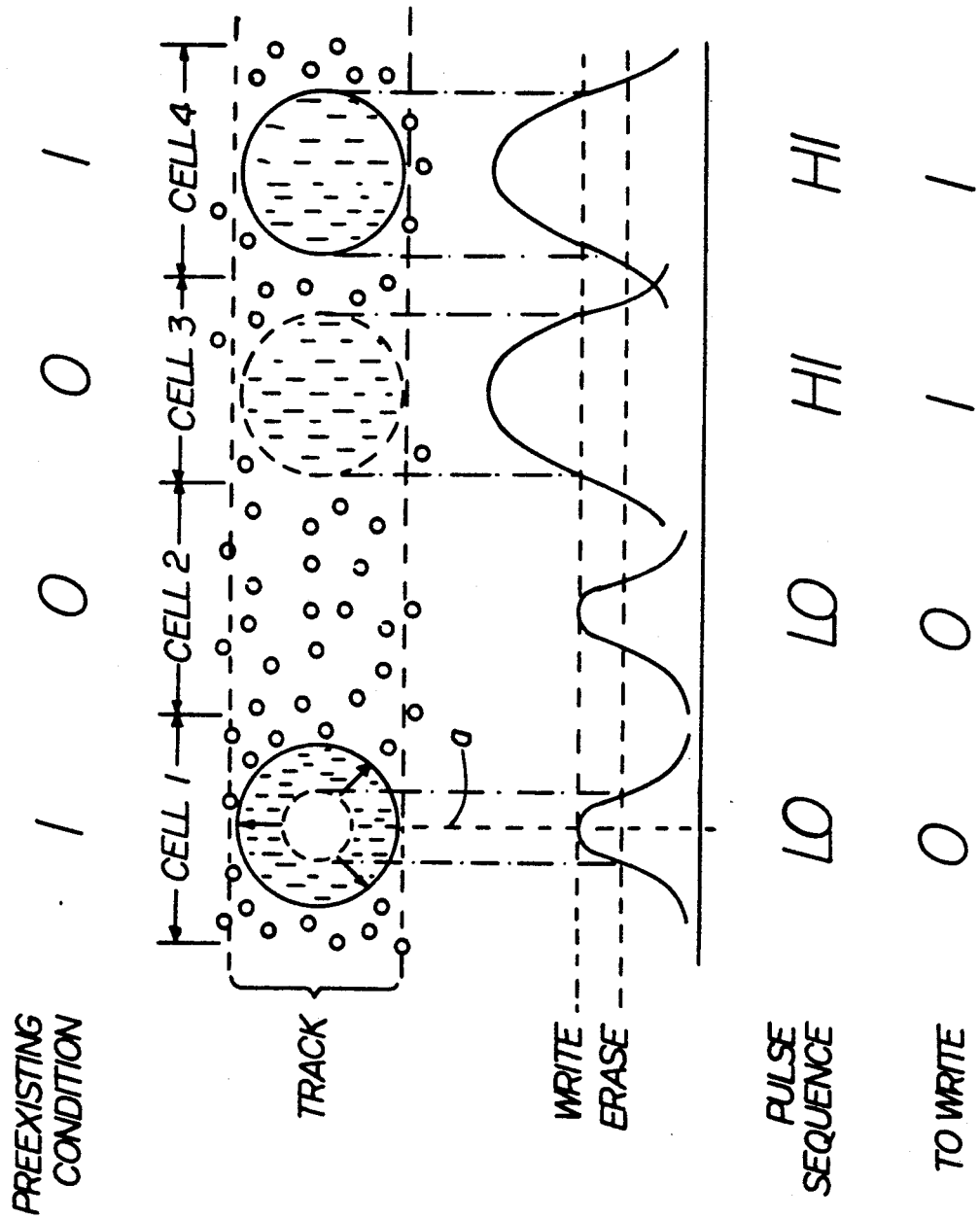
FIG. 5 is a schematic representation illustrating the effect of write and erase pulses on memory cells with and without walled domains.

FIG. 1 shows an erasable magneto-optical (M-O) read/write system comprising an M-O storage medium in the form of a rotatable disk 10 and an optical read/write head 12. The disk 10 includes a relatively thick transparent layer or overcoat 14, a relatively thin layer 16 of magnetic material and a protective coating layer 18. In most cases, the protective layer 18 will actually be coated on both sides of the magnetic layer 16. The active layer, the magnetic medium 16, is thus sandwiched between two protective layers 18.

Overcoat 14 is typically a molded polymer formed by injection molding or a glass substrate with a photopolymerization replication layer, both processes being well known in the art of compact disk manufacture. The overcoat 14 typically has a thickness of about 1.2 millimeters (mm).

Magnetic layer 16, a thin film typically a fraction of a micron thick, is made of a composition having suitable magnetic properties for use in magneto-optical storage. In particular, rare earth-transition metals are under active investigation. These materials have the advantage of being amorphous thus substantially eliminating grain boundary noise. They also have good vertical anisotropy and reasonable Kerr rotation angle. Compositions of this nature commonly use the formula $RE_{20-30}TM_{70-80}$, where RE (the rare earth constituent) is Gd, Tb or Dy and TM (the transition metal) is Fe or Co. A composition of interest at present is Tb, Fe, Co yielding a Kerr rotation angle of $0.35\theta_k$. Other rare Earths such as Pm, Sm, Eu, Ho, Er, Tm and other transition metals such as Mn, Ni, Te, Ru, Rh and pd may be considered for substitution. The present invention, however, is not necessarily limited to RE-TM compositions or uniform materials and requires only that the layer of magnetic material constitute the storage layer and support the formation of stable not even necessarily fixed, walled domains capable of being created and annihilated (i.e., written and erased) at substantially different respective energy levels as hereinafter described.

The purpose of layer (or layers) 18 is to protect magnetic layer 16 from degradation. Layer 18 should, therefore, form a relatively impermeable and nonreactive barrier. A particularly suitable material appears to be aluminum nitride ($AlN_3$), but other materials or combinations of several materials such as other nitrides like silicon nitride or boron nitride can be substituted. Silicon carbide or oxides of silicon and aluminum, for example, may also be successful in some applications. In any event, the composition and even the existence of the protective layer do not necessarily enter into the functionality of the media.

Head 12 consists of the optical elements necessary to deliver the laser beam to a point on magnetic layer 16, commonly, a 45° mirror or prism 20 and an objective lens 22. Lens 22 focuses the beam to a spot 22a, usually less than a micron in diameter, on the surface of magnetic layer 16. The radial displacement r of the optical axis of lens 22 from the center of rotation of the disk is controlled by a positioning system, for example, a servo-mechanism (not shown). The head position together with the instantaneous angular position of the disk 10 define the polar coordinates of a corresponding point on the disk.

FIG. 2 illustrates how information is stored in magnetic layer 16. The entire magnetic layer is initialized in one uniform magnetic orientation as shown in step 1 of FIG. 2 for a given cell along a given track representing a series of memory cells. (For convenience, the initial orientation is here defined as corresponding to logical "0".) The orientation is commonly perpendicular to the layer. Tracks on a disk may be concentric or spiral. As indicated by the arrows pointing upward in step 1, the magnetic layer is here originally magnetized in the upward vertical orientation. (The direction of initial magnetization is arbitrary.) The arrows represent individual magnetic domains within magnetic layer 16. In order to write a "1" in a given cell along the track, the domains within the cell are turned upside down in magnetic polarity as indicated in step 2 by the subregion of downward arrows. The transition from step 1 to step 2 in FIG. 2 represents the "write mode".

To return the same cell to its initial or "0" state, the domains within the cell must be flipped back to their initial upward orientation as shown in step 3 of FIG. 2. The transition from step 2 to step 3 represents the "erase mode" necessary to write a "0" when the cell has a preexisting opposite orientation, here a "1" created in step 2.

The coercivity of the magnetic medium in layer 16 is relatively high compared to that of a conventional magnetic disk. Magneto-optical layers commonly require several thousand Oersteds of magnetic field strength to switch a cell from one orientation to the other at room temperature. At elevated temperatures, however, the coercivity decreases very substantially. Indeed, at the so-called Curie temperature specific to the magnetic material being used, the domains lose much or all of their allegiance to their preexisting orientations and are free to reorient themselves.

It has been discovered that localized heating of the cell by a focussed laser pulse of sufficient energy can flip the domains within the cell without a magnetic field external to the magnetic layer by exploiting the self-demagnetizing effect which neighboring domains in the same layer have on the domains within the cell. Like poles of neighboring dipole domains with the same orientation are juxtaposed in an inherently repellant condition. Heating the cell beyond its Curie temperature permits the domains within the cell to indulge their tendency to reorient themselves in the opposite direction of their neighbors, to assume, in anthropomorphic terms, a more "comfortable", "nonconformist" orientation.

Assuming that the media has been initialized in a "0" state, writing a "1" in any cell requires the formation of an individual walled domain while erasing a cell already occupied by a walled domain in order to write a "0" requires annihilation of the walled domain. As shown in FIG. 3, the M-O media can be selected so that the laser power required to create a walled domain, i.e., to change a "0" to a "1" may be confined to a higher spectrum centered, for example, on 10 milliwatts, while the power for erasing or annihilating a walled domain, i.e., changing a "1" back into a "0", can be confined to a lower range centered on 5 milliwatts, for example, which does not overlap with the write range. Thus, the power ranges for writing and erasing can be mutually exclusive.

Writing and erasing in mutually exclusive power ranges is considered to be facilitated by the spatial distribution of energy in the laser beam. FIG. 4 graphs the energy distribution in terms of energy versus spatial displacement. The distribution is a Gaussian function symmetrical about the optical axis. A laser pulse in range A (FIG. 3), the higher range for writing, i.e., changing a "0" to a "1", has the Gaussian profile of curve A of FIG. 4. A beam in the lower range, i.e., for erasing a "1" to a "0", exhibits the dwarf Gaussian profile B of FIG. 4. The diameter of that portion of the beam which is designed to be effective in writing or erasing is indicated by A and B, respectively, in FIG. 4. Accordingly, the low energy erase beam has a significantly smaller effective diameter than the large energy write beam.

These different spatial distributions of effective energy levels can be employed in writing and erasing without a magnetic field external to the magnetic storage layer in a manner illustrated in FIG. 5. Let us suppose that the objective is to overwrite the binary series 0011 on a track in four cells numbered 1, 2, 3 and 4 which already contain the binary series 1001. Thus, cell No. 1 currently contains a preexisting walled domain representing a "1" which will have to be annihilated. Cell No. 2 contains no walled domain, but is filled with uniform "0" domains, no different in orientation from the domains of the surrounding region which are all in their uniform initialized "0" state. Accordingly, cell No. 2 should be left the same in order to remain "0". Cell No. 3 has a preexisting state the same as the preceding cell No. 2, i.e., all "0"s. In order to write a "1" in cell No. 3, a walled domain of opposite polarity to that of the surrounding background will have to be created. Cell No. 4 like cell No. 1 already contains a walled domain representing a "1". Unlike cell No. 1, cell No. 4 already contains the desired end result. Thus, it should be left unchanged.

Thus, in summary, the inner cells 2 and 3 are clear while the outer cells 1 and 4 already contain walled domains. To write "0"s, i.e., to annihilate a walled domain by overwriting a "0" or to leave a void cell void of a walled domain, the low power range is selected irrespective of the preexisting condition of the cell. Likewise, to write a "1", i.e., to change a "0" to a "1" (overwriting) by creating a walled domain where there was none or by leaving a walled domain where the cell was already occupied by one, the higher power exclusive range is selected irrespective of the preexisting condition of the cell.

In the example of FIG. 5, cell 1 is overwritten with a "0" in the following manner. A pulsed laser beam in the lower (erase) energy range of FIGS. 3 and 4 is directed to the center of cell 1. The optical axis of the beam is ideally coaxial with the central axis of the cell as shown. The low energy beam has an energy distribution such that only the central portion of the preexisting domain is heated substantially beyond the Curie point. The central portion of the domain in cell 1 is indicated by a concentric dashed circle. Freeing the central portion of the domain from its preexisting magnetization is believed to allow the central portion to flip to the "0" orientation thus creating a walled domain within a walled domain. The localized heating of the center portion of the preexisting walled domain in effect creates a local observation platform from which the central heated portion sees itself surrounded by individual local neighboring dipoles of identical polarity. Since like magnetic poles repel each other, the antipolarization impulses having been thermally unshackled, the central portion switches to the opposite polarity. It is believed that the stability of the resulting donut-shaped walled domain of "1"s is substantially lessened to the point where it tends to collapse through outward radial propagation of the interior "0" walled domain in a rapid transition in which the concentric boundaries merge, clearing the cell of walled domains and leaving it entirely filled with individual "0" domains like the background condition of the entire magnetic medium.

Moving on to the next cell, the optical head 12 issues a similar low power write (erase) pulse in alignment with the center of cell No. 2. In this case, however, the energy level attained by the pulse is nowhere sufficient to flip enough individual domains to "1"s to create a stable walled domain of "1"s, thus leaving cell 2, as desired, in its original "0" state.

Cells 3 and 4 are to end up in the "1" state. Thus the high power range is used for the write laser beam pulse. Cell 3 contains all "0"s. Applying the high power laser pulse to cell 3 heats up a wide area beyond the curie temperature to the write threshold and causes the relaxed heated area to flip in response to the nonconformist tendencies previously described.

Moving finally to cell 4, which already has a walled domain of "1"s, the high energy laser beam pulse is applied. In this case the individual domains of the entire walled domain react in unison unlike cell 3. From their larger observation platform, their concern is directed to the neighboring "0"s. Because the walled domain has already flipped to the "1" condition, it is already in its natural antisocial state and it stays that way.

The reason why it takes less energy to make a "0" walled domain within a "1" walled domain, as illustrated, appears to be related to the background magnetization of the remainder of the same magnetic layer. Since the entire magnetic layer was initially uniformly magnetized and it remains predominantly so, the magnetic layer itself acts like a bias magnet. From the hot spot in the center portion of a walled domain of "1"s, the background bias field is sufficiently removed that it encourages the flipping of the central portion of the walled domain in the same way that an external permanent magnet would.

To ensure that the weak pulse excites only a central region included within a preexisting walled domain to initiate an erasure, the pulse must be carefully directed to the cell. For example, cell locations can be predefined, and if the media is stationary, the write laser beam can be directed to the cell by relocating the beam axis. In the more conventional configuration, however, the magnetic media is provided on a spinning disk as shown in FIG. 1 or travelling tape. Because the media moves continuously, the memory cells defined on a track below the laser head pass through the optical axis continuously like hopper cars of a moving freight train below a stationary, elevated loading hopper. To develop a timing signal for use in triggering the laser pulse at the right time to hit the center of the cell, a pick-off (optical, electronic, magnetic, etc.) from the drive system responsible for moving the M-O media could be employed to generate precise timing pulses indicative of position.

Figure 6:
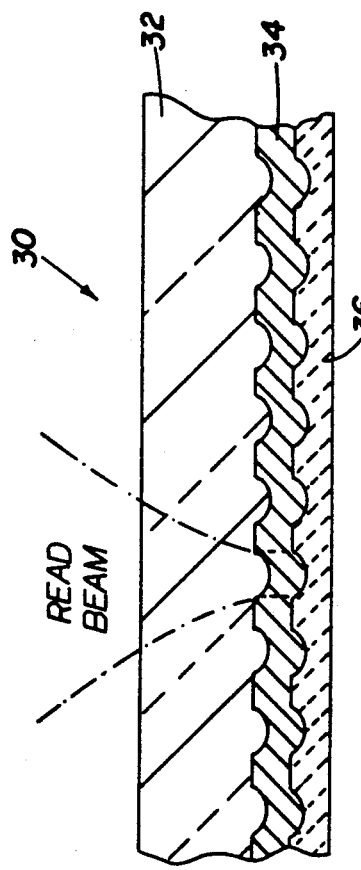
FIG. 6 is a schematic representation of a cross-sectional view of a portion of an M-O disk having an magnetic layer embossed with a timing track.

Another system appears to offer significant advantages however. By encoding the timing information directly on the medium along with the predefined cells, misregistration can be almost eliminated. As shown in FIG. 6, a composite M-O media 30 is shown which can be employed, for example, in a rotatable disk. Media 30 includes a transparent overcoat layer 32 which plays the role of layer 14 in FIG. 1, a magnetic layer 34 made of the same magnetic material as layer 16 of FIG. 1 but having regular undulations in the surface along each track, and protective layer 36 like layer 18 of FIG. 1.

The structure of FIG. 6 can be made by any of the many available manufacturing techniques for compact disks except that the reflective layer ordinarily used in compact disks is now replaced by the magnetic layer 34.

Figure 7:
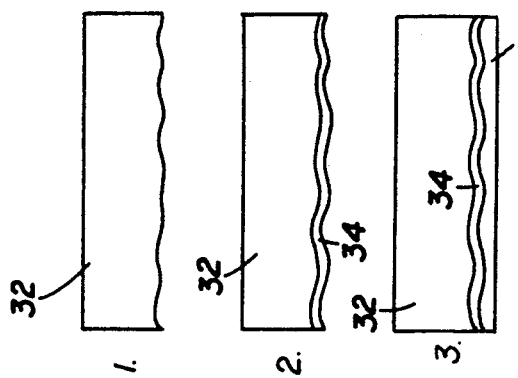
FIG. 7 is a schematic representation of three steps in forming the embossed M-O media of FIG. 6.

As shown in FIG. 7 for example the transparent overcoat layer 32 is first formed as a substrate. One side of the layer 32 is embossed with a repeating timing pattern which is preferably uniformly distributed on a single spiral track or plural concentric tracks. The embossing step can by way of injection molding, photopolymerization replication, pressing or any other technique capable of impressing a pattern.

In step 2 the magnetic layer 34 is applied to the embossed face of the overcoat 32. Finally, in step 3 the protective layer 36 is applied to cover the exposed underside of the magnetic layer 34. If desired, a protective layer like layer 36 can be applied before the magnetic layer is applied in step 2 to sandwich the magnetic layer between two parallel protective coatings.

Figure 8:
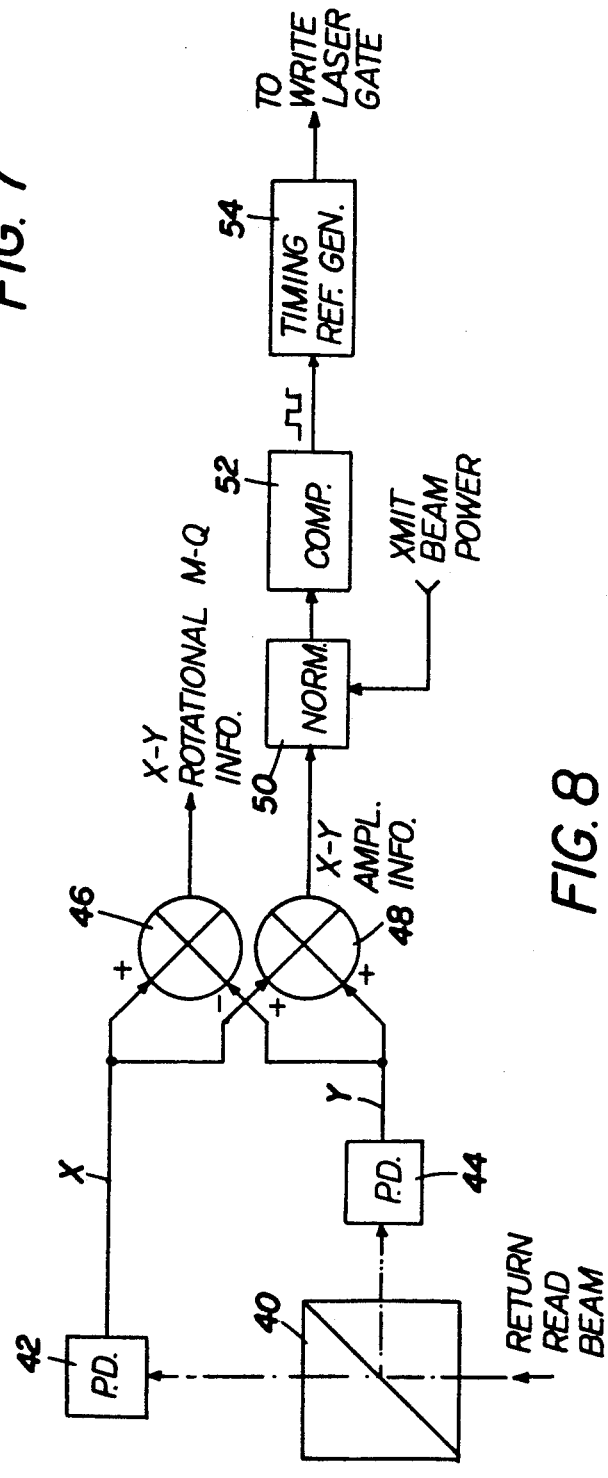
FIG. 8 is a schematic optical and electrical diagram illustrating a signal processing scheme for recovering amplitude as well as rotational modulation of the read beam.

The resulting structure contains in effect a fixed optical read-only track containing no information other than spacing, superimposed on an erasable magneto-optical track. As shown in FIGS. 6 and 8, a read beam focused on the undulating track encounters periodically varying degrees of destructive interference because of the quarter wavelength depth of the low spots on the undulating surface of the track. This destructive interference causes a modulation in the amplitude of the reflected beam picked up via the optical head. A spatial relationship is forced between the defined memory cells along the track and the amplitude variation of the return read beam to establish the location of each cell so that the laser beam can be aimed at the center of the pre established cell.

As shown in FIG. 8, the return beam containing rotational information due to the underlying magnetic cells is directed through a polarizing beam splitter 40 which splits the return beam into two output beams. Because of the rotation of the polarization angle of the read beam as it traverses walled domains, the difference in amplitude of the two output beams will fluctuate according to the stored data. These differential beam intensities are detected in photodiode detectors 42 and 44. The corresponding electrical outputs X and Y from the photodetectors 42 and 44 are passed to algebraic combining circuitry 46 which generates a signal proportional to the difference between signals X and Y thus removing common mode components and leaving by design only rotational information which is passed to detection circuitry (not shown) which discriminates between "0" and "1" bits in the memory cells. Signals X and Y are also passed to a summer 48 which in effect recombines the signals split by element 40 to produce an output whose amplitude varies periodically according to the undulating topography of the track. The output of summer 48, in the form of a sine wave or some other periodic analog signal, is passed to a normalization circuit 50, which may take the form of a linear attenuator, to scale the reflected intensity to the incident, i.e., transmitted, beam power. Normalization has to take into account not only uncompensated hysteresis, drift and environmental factors, but also the deliberate intensity modulation employed to realize read, weak write (erase) and strong write functions. The function of the normalization circuit 50 is thus to remove all amplitude variation in the output of summer 48 attributable to variations in transmitted beam intensity. The output of normalization circuit 50 is passed to a comparator 52 to produce a square wave output. The output of comparator 52 forms a clock input to timing reference signal generator 54 which generates the appropriate output to trigger the write laser beam.

Superimposing the timing information on the magnetic medium track is believed to be advantageous because it allows the track to be self-timing, thus allowing the timing information itself to determine the location of the memory cells directly, unalterably and repeatedly. Moreover, the same read/write laser beam can be employed to recover timing information.

Operation

In operation the timing track is optically read simultaneously with writing and erasing of information on the M-O medium. The timing information is used to generate a trigger pulse which fires the laser beam at the precise instant necessary for it to align with the center portion of a given memory cell. Meanwhile, the data bit to be stored in the given cell has determined whether the high or low power pulse will be applied irrespective of the preexisting condition of the cell. To write a "0" or a "1", a pulse of low or high intensity, respectively, is applied in optical alignment with the center of the memory cell according to the timing pulse. Thus any consecutive series of "0's" and "1's" can be written over any preexisting series of bits in a single pass.

The M-O recording technique employing a single laser and single laser beam of selectable energy for inherently discriminating between writing and erasing eliminates the need for a preliminary erase cycle since no slowly switching external magnetic field is employed. Nor does the present technique rely upon first determining the preexisting condition of the cell by reading before writing. Moreover, the disclosed overwriting technique does not require reference layers, extra reflective layers or other magnetic media within the M-O medium although such additional layers may be compatible with the present technique. This overall simplification of the write/erase process for M-O media yields potentially great cost and performance benefits which are predicted to advance commercial implementation of M-O technology as a replacement for conventional magnetic storage. The self-timing track represents a reliable mass-producible technique of synchronizing the laser pulses with the medium. Because the timing track is preferably nonmagnetic, it can be made virtually indestructible.

Other embodiments are within the following claims. For example, while a rotating disk has been described other forms of M-O media, such as tape, can be adapted for use with the present invention. Nor is the invention limited to any particular read/write head design. While lasers are commonly used, any form of directed energy capable of sufficient localized heating and of application at the appropriate different energy levels may be employed. The embodiment disclosed herein relies on modulation of laser power; heating energy delivered to the magnetic layer is dependent, of course, on the product of power and duration of application or pulsewidth. Energy separation for write and erase pulses can be achieved by modulating either one of these parameters, power or pulsewidth, or both to achieve two mutually exclusive energy levels. The structure of the M-O medium may be varied to accomplish other objectives while still employing the overwriting technique described herein. The self-timing track technique can be implemented in other ways by analogy and detection of the timing signal can be accomplished in ways different from the embodiment disclosed herein without exceeding the scope of the invention.

I claim:

1. A method of overwriting a magneto-optical recording medium having a layer of magnetic material substantially uniformly initialized in one magnetic orientation deposited on a substrate made of nonmagnetic material, comprising the steps of
   defining respective locations of memory cells in the magnetic layer by embedding in said substrate optically recoverable nonmagnetic indicia distributed corresponding to said cells and superimposed respectively with said cells,
   optically recovering said indicia,
   directing energy within a first predetermined range at a spot, in accordance with said recovered indicia, substantially centered within a cell in said magnetic layer to write thermally a magnetic symbol representing a bit of one of two possible states by either leaving the cell unaffected if it does not already have a walled domain or by reversing the polarity of a preexisting walled domain with a predetermined magnetic polarity in the cell, and
   directing energy within a second predetermined range substantially mutually exclusive of the first range, at a spot in accordance with said recovered indicia substantially centered within another cell in said magnetic layer to write thermally a magnetic symbol representing a bit of the other state by either leaving said another cell unaffected if it already contains a walled domain with a predetermined magnetic polarity or by reversing the polarity of a region within said another cell to create a walled domain if said another cell did not already have a walled domain.

2. The method of claim 1, wherein said first predetermined energy range is lower than said second predetermined range.

3. The method of claim 1, wherein said indicia are permanent.

4. The method of claim 1, wherein the step of embedding includes
   forming said nonmagnetic indicia by treating the surface of said substrate to form areas of different reflectivities arranged in a pattern in the substrate to define a self-timing track in said substrate,
   wherein the step of optically recovering said indicia includes
   detecting the variation in intensity of a beam reflected from said areas of different reflectivities, and
   generating a timing signal in response to said detected variation in intensity of the reflected beam, and
   the steps of directing energy in accordance with said recovered indicia include using said timing signal to assist in aligning the directed energy with one of said memory cells.

5. A method of overwriting a magneto-optical recording medium having a layer of magnetic material deposited on a substrate, comprising the steps of:
   prerecording timing information in the substrate having an immutably fixed relationship with physical locations of memory cells in said magnetic layer,
   recovering said timing information to assist in directing energy at said recording medium,
   directing said energy within a first predetermined range at a spot on said magnetic layer to write thermally a magnetic symbol representing a bit of one of two possible states, and
   directing said energy within a second predetermined range substantially mutually exclusive of said first range at another spot on the magnetic layer to write thermally a magnetic symbol representing a bit of the other state,
   the steps of directing said energy being carried out irrespective of the state of respective preexisting magnetic symbols at said spots.

6. An overwriting system for magneto-optical recording, comprising:
   a magneto-optical medium having a layer of magnetic material deposited on a substrate, said layer of magnetic material being substantially uniformly initialized in one magnetic orientation and including memory cells at predefined locations, said medium incorporating self timing information distributed throughout the substrate, said predefined locations of cells are superimposed on said self timing information and
   an energy beam directing system adapted to direct heating energy within a first predetermined range to a spot, on said medium, determined by said self timing information so as to be substantially centered within a cell in said magnetic layer to write thermally a magnetic symbol representing a bit of one of two possible states by leaving the cell unaffected if it does not already have a walled domain with a predetermined magnetic polarity or by reversing the polarity of a preexisting walled domain in the cell, and to direct said heating energy within a second predetermined range substantially mutually exclusive of said first range to another spot on said medium determined by said self timing information so as to be substantially centered within said another cell in the magnetic layer to write thermally a magnetic symbol representing a bit of the other state by either leaving said another cell unaffected if it already contains a walled domain with a predetermined magnetic polarity or by reversing the polarity of a region within said another cell to create a walled domain if said another cell did not already have a walled domain.

7. The system of claim 6, further comprising a detector adapted to recover said timing information to assist in aligning the directed energy with one of said memory cells.

8. The system of claim 6, wherein said medium has areas of different reflectivities arranged in a pattern in the substrate to define said self timing information as a self-timing track which corresponds to a series of memory cells, and
   a circuit adapted to detect the variation in intensity of a beam reflected from said areas of different reflectivities and generate a timing signal in response to said variation in intensity of said reflected beam from said areas of different reflectivities to assist in aligning said directed heating energy with one of said memory cells.

9. The system of claim 6, wherein said first predetermined range is lower than said second predetermined range.

10. The system of claim 9, wherein said first predetermined range is selected such that the diameter of a preexisting walled domain is substantially larger than the diameter of a portion of the directed energy beam which is effective in heating the magnetic layer to a sufficient threshold to create a walled domain within another walled domain.

11. A method of synchronizing directed energy with a magneto-optical medium having a substrate and a magnetic layer deposited on said substrate initialized in one magnetic orientation, comprising the steps of:

superimposing magnetic memory cells provided in the magnetic layer over self-timing information nonmagnetically stored in said substrate, interrogating said magneto-optical medium by directing an input beam of energy with a predetermined power and polarization angle at said medium and recovering magnetically stored information in said magnetic layer from a corresponding beam of energy reflected from said medium, said reflected beam having a polarization angle influenced by the magnetic layer, and recovering synchronously said self-timing information from the same reflected beam to assist in directing energy to said magnetic memory cells, said magnetically stored information and said self timing information being recovered by splitting said reflected beam into two beam paths differentiated by their sensitivity to the polarization angle of the reflected beam, converting the energies of the beams in said two paths to respective electrical signals of correspondingly varying levels, combining said signals in one way to recover said timing information, and combining said signals in another way to recover said magnetically stored information.

12. The method of claim 11, wherein said one way is accomplished by substantially summing the signals and said another way is accomplished by substantially differencing the signals.

13. The method of claim 11, further comprising normalizing said signals combined in said one way to take into account said predetermined input beam power.

14. An overwriting system for magneto-optical recording, comprising a magneto-optical medium having a layer of magnetic material on a substrate, means for defining a single optical path to said medium, means for sending a relatively low power level read beam to said medium via said path, said read beam having a predetermined polarization angle, means for sending a write beam of two distinct power levels, both higher than said read beam relatively low power level to said medium along said path, means for detecting energy in a beam reflected by said medium from said sent read or write beam along said optical path, wherein the reflected read beam has a polarization angle influenced by said layer of magnetic material, means for sensing the polarization angle of the reflected read beam and comparing it to the polarization angle of the sent read beam to recover magnetically stored information in said layer of magnetic material from said medium, and means for simultaneously sensing amplitude of said reflected beam energy to recover nonmagnetically stored information embedded in the substrate, and means for normalizing the sensed reflected beam energy with respect to the sent read beam.

* * * * *